United States Patent Office 3,520,339
Patented July 14, 1970

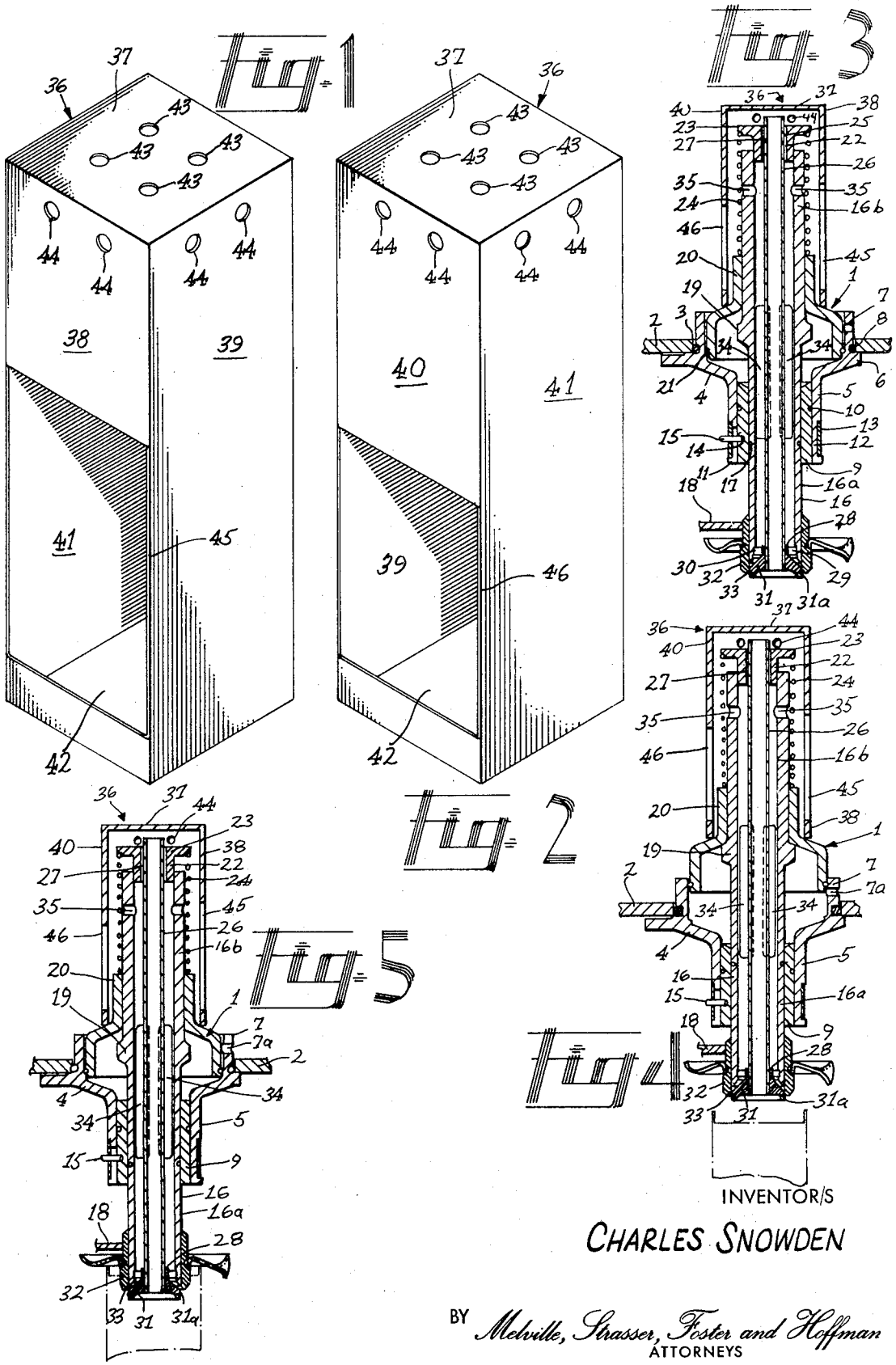

3,520,339
CONTAINER FILLING MACHINES
Charles Snowden, 6887 Wescurt Lane,
Goshen, Ohio 45122
Filed June 4, 1968, Ser. No. 734,487
Int. Cl. B67c 3/00; B67d 3/02
U.S. Cl. 141—296        6 Claims

ABSTRACT OF THE DISCLOSURE

Means for preventing a foam lock in liquid dispensing machines of the type having a supply tank for the liquids being dispensed and one or more units for dispensing metered amounts of the liquid, portions of the units extending upwardly into the tank and reciprocating therein during the metering and dispensing operations. The means comprises a cover member for each metering and dispensing unit portion extending into the tank, the member having a plurality of perforations as described hereinafter.

BACKGROUND OF THE INVENTION

Field of the invention

The invention relates to an improvement in liquid dispensing means of the type having a supply tank and one or more metering and dispensing units, and more particularly to means for preventing a foam lock of the type which would interfere with the proper action of the metering and dispensing units.

Description of the prior art

Currently, extensive use is being made in many fields of automatic liquid metering and dispensing machines, capable of depositing a metered quantity of any desired liquid into an appropriate container. The containers may be glass, plastic, paper and the like. Where required, such machines often have in association therewith means for forming and preparing the containers and for presenting them to one or more filling stations. After filling, additional means are provided for closing, sealing and other required operations.

Such liquid dispensing means are generally characterized by a supply tank for the liquid to be dispensed. Float means or the like are provided to maintain a substantially constant liquid level in the supply tank. Operatively connected to the supply tank there is generally one or more metering and dispensing units. This last mentioned unit withdraws a measured amount of the liquid from the supply tank and dispenses it into the waiting container. In many instances, the metering and dispensing unit or units extend downwardly from the bottom of the supply tank and have portions extending upwardly into the supply tank and into the body of the liquid contained therein. Air exhaust means are provided in connection with the metering and dispensing unit whereby air being displaced from the container during the filling operation may be properly vented. Often, the air exhaust outlet is located in that part of the metering and dispensing unit extending into the supply tank. In addition, that portion of the metering and dispensing unit located within the supply tank generally has a reciprocating movement whereby the unit is opened to allow a metered amount of liquid from the supply tank to enter therein, and then is closed prior to the dispensing of the metered amount of liquid into the container. Furthermore, in some machines, the entire supply tank with its one or more dispensing units rotates about a central axis whereby the metering and dispensing units and the empty cartons may be properly aligned for the filling thereof.

The automatic container filling machine described in United States Letters Patent 3,002,540, is exemplary of the type of machine being described.

It will be understood from the above that the liquid in the supply tank is subjected to considerable agitation. This is accentuated by the fact that such machines are capable of filling a number of cartons simultaneously and a great quantity of cartons per minute.

Difficulty is sometimes encountered, particularly with the dispensing of liquids having a tendency to foam. Milk, for example, is but one of many liquids having a foaming characteristic. In the dispensing of such liquids, it is not uncommon that a foam-lock can occur, caused by an accumulation of foam about the air exhaust outlet. Such a foam-lock can result in the preventing of the metering and dispensing unit from dispensing the proper amount of liquid into the container. It will be appreciated that this can be a serious problem when the container is intended to have a metered amount of the liquid in it, and when the containers are being filled at the rate of many containers per minute.

The present invention is directed to means whereby the accumulation of foam about the air exhaust outlet of each dispensing and metering unit is prevented so that rapid dispensing with accurate metering can be achieved even with liquids having a foaming characteristic.

SUMMARY OF THE INVENTION

In an automatic liquid dispensing device of the type having a supply tank holding liquid to be dispensed and one or more metering and dispensing units, each metering and dispensing unit having a reciprocating portion extending through the bottom of the supply tank and upwardly into the liquid, cover means are provided for that portion of each metering and dispensing unit extending into the liquid. Each cover means prevents an accumulation of foam about the air exhaust outlet of its respective dispensing and metering unit, whereby rapid dispensing and accurate metering can be achieved with liquids having a tendency to foam.

The cover member comprises a hollow body, open at one end. The hollow body is intended to encompass and be supported by that portion of its respective dispensing and metering unit which extends into the liquid in the liquid storage tank. The closed end and the sides of the cover member are provided with a plurality of perforations through which air from the air exhaust outlet of the metering and dispensing unit may escape.

BRIEF DESCRIPTION OF THE DRAWINGS

FIG. 1 is an isometric view of the cover of the present invention illustrating the top and two sides thereof.

FIG. 2 is an isometric view, similar to FIG. 1, but illustrating the top and the remaining two sides of the cover member of the present invention.

FIG. 3 is a cross sectional elevational view of a metering and dispensing unit, with the cover member of the present invention applied thereto.

FIG. 4 is a cross sectional elevational view similar to FIG. 3, but illustrating the dispensing and metering unit in the position it assumes when it withdraws liquid from the supply tank.

FIG. 5 is a cross sectional elevational view similar to FIG. 3, but illustrating the metering and dispensing unit in the position it assumes during the dispensing of the liquid contained therein into an appropriate receptacle.

DESCRIPTION OF THE PREFERRED EMBODIMENTS

While the invention is not intended to be so limited, for purposes of an exemplary embodiment, the cover member of the present invention will be described as applied to a dispensing and metering unit of the type described in the above mentioned U.S. Pat. 3,002,540. It will be understood, however, that the device of the present invention may be applied to the dispensing and metering unit of any automatic filling device wherein the dispensing and metering unit has a portion extending into the liquid in a supply tank and has an air exhaust outlet in association with that portion.

A dispensing and metering unit of the general type to which the invention of the present application is directed is illustrated in FIG. 3 and generally indicated at 1. The bottom of a liquid supply tank is fragmentarily shown at 2. The bottom 2 has a perforation 3 in which the unit 1 is removably mounted in liquid-tight fashion.

The unit 1 comprises a fixed cylindrical member 4 having a downwardly depending portion 5 of lesser diameter, an annual flange 6 and an upwardly extending cylindrical wall portion 7. When the unit is in place, the wall portion 7 extends upwardly through the tank perforation 3 and into the liquid contained therein. The annular flange 6 seats against the exterior surface of the supply tank bottom. A liquid-tight seal is achieved by means of a resilient O-ring located in an annular notch in the wall 7 and engaging that surface forming the perforation 3.

Within the cylindrical portion 5 of the fixed cylinder 4 there is mounted a calibration bushing 9. A liquid-tight seal is achieved between the bushing 9 and the cylindrical portion 5 by virtue of a resilient O-ring 10. There is a slot 11 in the cylindrical portion 5, the cylindrical portion also has an annular recess 12. A spring clip 13 is located in the annular recess 12 and covers the notch 11. The spring clip 13 has a plurality of perforations therein, which perforations differ in vertical height. The bushing 9 has a perforation 14 therein. A locating pin 15 is adapted to extend through any one of the perforations in the spring clip 13 and engage the perforation 14 in the bushing 9. In this way, the position of the bushing 9 within the cylindrical portion 5 of the fixed cylinder can be varied vertically so as to vary the internal volume of the fixed cylinder 4. The bushing will be held in adjusted position by virtue of the locating pin 15 and the spring clip 13. By these means, the amount of liquid dispensed by the unit 1 can be accurately preset.

A reciprocating cylinder 16 is slidably mounted within the bushing 9. A liquid-tight seal is formed between the reciprocating cylinder 16 and the internal surface of the bushing 9 by virtue of a resilient O-ring 17 located in an annual notch in the reciprocating cylinder. The cylinder 16 is caused to reciprocate by virtue of motion imparted thereto by means of an arm (fragmentarily indicated at 18) which engages the cylinder and which, in turn, is actuated by appropriate mechanism forming a part of the automatic filling machine. The reciprocating cylinder 16 has a lower portion 16a and an upper portion 16b. The upper portion 16b has a greater external diameter than the lower portion 16a and there is an annular abutment means 19 located between the portions 16a and 16b.

A barrel-shaped displacement cylinder 20 is slidably mounted on the upper portion 16b of the reciprocating cylinder. The lower enlarged portion of the displacement cylinder 20 is adapted to be slidably received within the wall portion 7 of the fixed cylinder 4 and to form a liquid-tight seal therewith by virtue of a resilient O-ring 21 located in an annular notch in the exterior surface of the lower portion of the displacement cylinder 20.

The upper end of the reciprocating cylinder 16 has a cap means 22 affixed therein. The cap means 22 has an annular flange 23. A spring 24 is mounted on the portion 16b of the reciprocating cylinder. One end of the spring 24 abuts the annular flange 23 of the cap 22. The other end of the spring abuts the upper edge of the displacement cylinder 20. Thus, the displacement cylinder is constantly urged downwardly on the portion 16b of the reciprocating cylinder 16.

The cap 22 has a central perforation 25. An air exhaust tube 26 is concentrically located within the reciprocating cylinder 16. The upper end of the air exhaust tube extends through the perforation 25 in the cap 22, and is held therein by means of a spring clip (not shown). The exterior surface of the air exhaust tube 26 is spaced from the interior surface of the cap perforation 25 so as to form an annular passage 27 constituting a liquid overflow vent.

The lower end of the air exhaust tube carries a detachable orifice control collar 28 having one or more radial abutments 29 engaging a suitable stop shoulder 30 in the reciprocating cylinder.

The lowermost end of the air exhaust tube 26 carries a valve seat 31 of frusto-conical configuration. A valve collar 32 is slidably mounted on the exterior surface of the portion 16a of the reciprocating cylinder. The valve collar 32 has an annular tapered surface 33 adapted to cooperate with the seat 31 which carries a resilient O-ring 31a. The valve collar 32 may be raised upwardly by contact with the container to be filled. When so raised, fluid from the reciprocating cylinder can be dispensed from the annular orifice opening formed between the seat 31 and the lower end of the reciprocating cylinder. The collar 28 will permit a vertical adjustment of the seat 31 so that this annular opening can be enlarged or made smaller, as desired. When the surface 33 of the valve collar 32 contacts the seat 31 and O-ring 31a, the outlet orifice is closed in liquid-tight fashion.

The reciprocating cylinder 16 is provided with a plurality of elongated filling openings 34 whereby liquid within a chamber formed by the fixed cylinder 4 and the displacement cylinder 20 can pass into the reciprocating cylinder 16. In addition, the upper portion 16b of the reciprocating cylinder is provided with a plurality of liquid overflow vents 35.

The operation of the dispensing and metering unit 1 may be described as follows. Through the agency of appropriate mechanism (not shown) constituting a part of the filling machine, the arm 18 causes the reciprocating cylinder 16 to assume its uppermost position, as indicated in FIG. 4. By virtue of contact with the abutment means 19, the displacement cylinder 20 moves upwardly with the reciprocating cylinder, opening a plurality of inlets (one of which is shown at 7a) in the upwardly extending portion 7 of the fixed cylinder 4. Liquid from the supply tank 2 flows into the interior of the reciprocating cylinder 16, the fixed cylinder 4 and the displacement cylinder 20.

The arm 18 then causes the reciprocating cylinder 16 to begin its downward descent. As it moves downwardly, the displacement cylinder 20, under the influence of spring 24, telescopes within the upstanding portion 7 of the fixed cylinder 4 until it reaches its seated position as illustrated in FIG. 3. Liquid within the reciprocating cylinder, the fixed cylinder and the displacement cylinder is thus pressurized and excess liquid is discharged from the annular overflow vent 27 and the additional overflow vents 35.

After the displacement cylinder has been seated, the reciprocating cylinder continues its downward movement. The abutment 19 moves downwardly into the chamber formed by the displacement cylinder 20 and the fixed cylinder 4 as does a portion of the larger diameter part 16b of the reciprocating cylinder. In this way, the enclosed volume of the liquid within the reciprocating cylinder, the fixed cylinder and the displacement cylinder is additionally reduced until the reciprocating cylinder reaches the lowermost point of its stroke. Excess liquid continues to exit via overflow vents 27 and 35 until the desired metered amount of liquid is obtained.

The reciprocating cylinder will continue its downward movement, approaching the lower limit of its travel. When an appropriate container is in proper position beneath the dispensing and metering unit, the top of the container will contact means (not shown) which, in turn, will cause the valve collar 32 to move upwardly. Fluid within the metering and dispensing unit will pass through the annular opening between the lower end of the reciprocating cylinder 16 and the seat 31 into the container. The flow of discharged fluid tends to spread out and follow the interior walls of the container with the result that air within the container, displaced by the incoming fluid, will move upwardly through the air exhaust tube 26. In FIG. 5, the dispensing and metering unit is illustrated in its discharging position.

When the fluid has been discharged into the container, the arm means 18 will cause the reciprocating cylinder to begin its upward movement again. As the reciprocating cylinder moves upwardly, the valve collar 32 will again contact the seat 31 and O-ring 31a closing the bottom end of the reciprocating cylinder. The abutment means 19 will contact the displacement cylinder 20 and cause it to move upwardly. Ultimately, the dispensing and metering unit will again assume the position shown in FIG. 4.

The above described action of the dispensing and filling unit is rapidly accomplished. It will be understood by one skilled in the art that when a number of such units are located in a supply tank and are continually reciprocating the fluid located within the supply tank will be subjected to considerable agitation. Certain fluids, such as milk and the like, have a tendency to foam when subjected to agitation. It has been found that when a layer of foam is formed and covers the upper or discharge end of the air exhaust tube 26, a "foam-lock" can occur whereby the air within the container being filled cannot properly escape. This, in turn, can prevent dispensing of the full amount of fluid within the dispensing and metering unit. As a consequence, containers passing through the automatic filling machine may receive something other than the desired metered amount of fluid.

The present invention is based upon the discovery that if a cover means is provided for the portion 16b of the dispensing and metering unit, a foam-lock and its attendant difficulties may be obviated.

FIGS. 1 and 2 illustrate an embodiment of the cover means of the present invention. While the cover means may be cylindrical in configuration, for purposes of an exemplary showing it is illustrated as comprising a rectangular structure generally indicated at 36. The structure comprises a top 37 and four sides 38 through 41. The bottom of the cover member is open, as at 42.

The top 37 of the cover has a plurality of perforations 43. Each of the sides, 38 through 41, have a series of perforations 44 near their upper ends.

The side 38 of the cover member 36 has a large opening, indicated at 45. The opening 45 is located in the lower portion of the side 44. The opening 45 has a width substantially equal to the width of the cover member and a length greater than one-half the height of the cover member.

The side 40 of the cover member lies opposite the side 38. The side 40 also has a large opening, indicated at 46. The opening 46 is located in the lower portion of the side 40. The opening 46 has a width substantially equal to the width of the cover member and a length equal to less than half the height of the cover member.

The bottom edges of the perforations 45 and 46 lie substantially in the same plane. The upper edge of the opening 45, however, is higher than the upper edge of the opening 46. This is clearly illustrated in FIGS. 3 through 5.

The last mentioned figures illustrate the application of the cover member 36 of the present invention to the dispensing and metering unit 1. It will be noted that the cover member surrounds the upper portion of the unit 1 and is supported at its lower end by the displacement cylinder 20. The top 37 of the cover member is spaced from the upper end of the air exhaust tube 26.

The device of the present invention has been demonstrated to work successfully to prevent a foam-lock irrespective of the lever of the liquid maintained in the supply tank 2. Under usual operating conditions, when the displacement cylinder 20 is in its fully seated position (as shown in FIGS. 3 and 5) the upper edge of the perforation 46 will lie above the liquid level as, of course, will the upper edge of the larger perforation 45. While the invention is not so limited, in an exemplary use of the device, the upper edge of the perforation 46 will lie about 1 inch above the liquid level in the tank 2 and the upper edge of the perforation 45 will lie about 2 inches above the liquid level, when the displacement cylinder 20 is in its fully seated position.

It has been found that when the cover member of the present invention is positioned as illustrated in FIGS. 3 through 5, resting freely at its bottom edge on the displacement cylinder 20, a foam-lock is prevented and accurate metering and dispensing can be achieved with liquids having a foaming tendency. During the movement of the reciprocating cylinder 6 and the displacement cylinder 20, air accumulates inthe top of the cover member and foam is not permitted to build up around the exit end of the air exhaust tube 26. As the cover member 36 moves downwardly with the displacement cylinder 20 and as air is ultimately exhausted from the container being filled via the air exhaust tube, excess air exits the cover member through perforations 43, 44, 45 and 46. This exiting air tends to blow foam away from the cover member and a foam-lock cannot form.

The cover member 36 may be made of any suitable material including plastic, metal or the like. Excellent results have been achieved through the use of stainless steel which is durable and easy to clean. In addition, the cover member may be easily and inexpensively manufactured.

The dimensions of the cover member of the present invention do not constitute a limitation. The dimensions will depend upon the size of that portion of a dispensing and metering unit over which the cover member will be placed. The number and diameter of the perforations 43 and 44 should be such as to permit adequate escape of air from within the cover member, while preventing the entrance of foam therethrough.

Modifications may be made in the invention without departing from the spirit of it.

The embodiments of the invention in which an exclusive property or privilege is claimed are defined as follows:

1. In a liquid dispensing machine of the type having a supply tank filled with liquid to be dispensed and at least one metering and dispensing unit, said unit having a portion extending upwardly into said supply tank, said portion having an air exhaust outlet in association therewith, the improvement comprising a cover member supported by said portion and surrounding a part at least thereof, said cover means having a plurality of openings therein, whereby said cover means prevents a foam-lock about said exhaust outlet permitting accurate metering and dispensing action by said unit.

2. The structure claimed in claim 1 wherein said cover member comprises a hollow body having an open end, said cover member being freely supported by said portion of said metering and dispensing unit extending upwardly into said supply tank, the inside surfaces of said cover member being spaced from said air exhaust outlet.

3. The structure claimed in claim 2 wherein said cover member comprises four sides and a top.

4. The structure claimed in claim 3 wherein said top has a plurality of perforations therein, each of said sides having at least one perforation at the upper end thereof, near said top.

5. The structure claimed in claim 4 wherein a first one of said sides has an opening therein, said opening having a width substantially equal to the width of said first side and a length less than one-half the height of said first side, and wherein a second one of said sides lying opposite said first side has an opening therein, said last mentioned opening having a width substantially equal to the width of said second side and a length greater than one-half the height of said second side.

6. The structure claimed in claim 5 wherein said openings have bottom edges lying substantially in the same plane perpendicular to the long axis of said cover member and located near the bottom of said cover member.

References Cited

UNITED STATES PATENTS 3,002,540  11/1961  Monroe _____ 141—308

FOREIGN PATENTS 1,151,265  8/1957  France.
664,865  9/1938  Germany.

HERBERT F. ROSS, Primary Examiner